Aug. 7, 1923.　　　　　　　　　　　　　　　　1,464,065
C. W. DICKOVER ET AL
MOTOR REPAIR STAND
Filed Sept. 2, 1921　　　　2 Sheets-Sheet 1

Inventor
Charles W. Dickover
and Earl W. Henry.
By (signature)
Attorney

Aug. 7, 1923.
C. W. DICKOVER ET AL
1,464,065
MOTOR REPAIR STAND
Filed Sept. 2, 1921
2 Sheets-Sheet 2
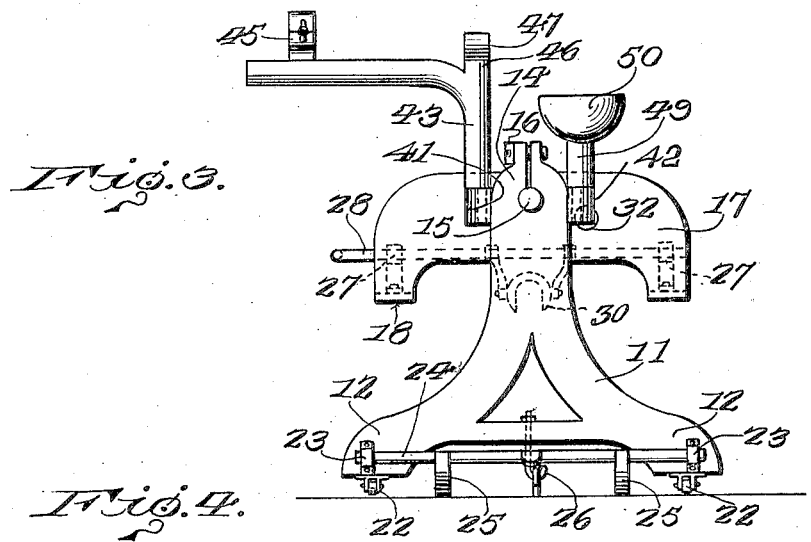
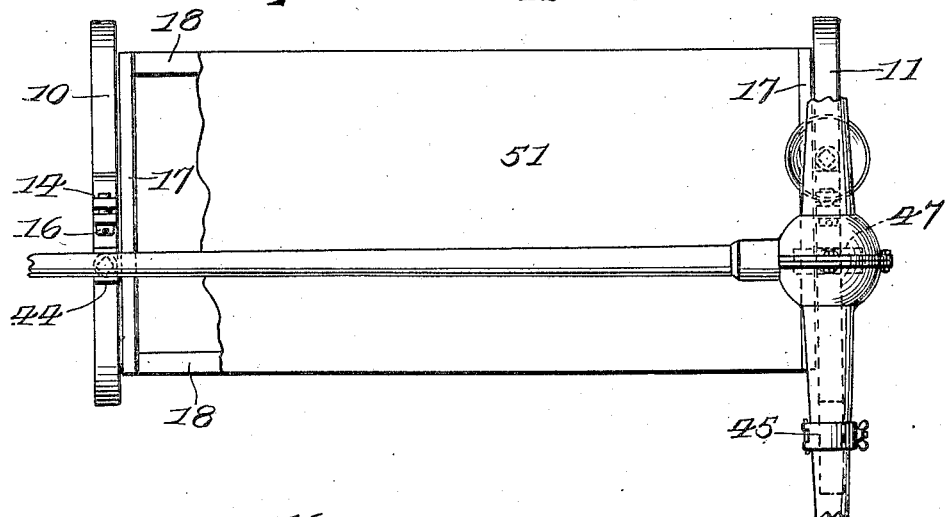
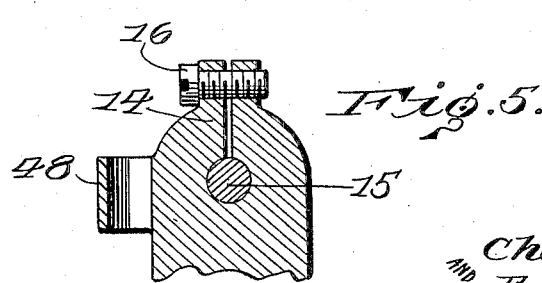
Inventor
Charles W. Dickover
and Earl W. Henry
By Chandlee Chandlee
Attorney Patented Aug. 7, 1923.

1,464,065

UNITED STATES PATENT OFFICE.

CHARLES W. DICKOVER AND EARL W. HENRY, OF TOMAH, WISCONSIN; SAID DICKOVER ASSIGNOR TO R. A. GARMAN AND A. W. McMULLEN, BOTH OF MONROE COUNTY, WISCONSIN.

MOTOR-REPAIR STAND.

Application filed September 2, 1921. Serial No. 497,989.

*To all whom it may concern:*

Be it known that we, CHARLES W. DICKOVER, and EARL W. HENRY, citizens of the United States, residing at Tomah, in the county of Monroe, State of Wisconsin, have invented certain new and useful Improvements in Motor-Repair Stands; and we do hereby declare the following to be a full, clear, and exact description of the invention, such as will enable others skilled in the art to which it appertains to make and use the same.

This invention relates to new and useful improvements in stands and particularly to stands used for supporting automobile motors and axles, for purposes of cleaning and repairs.

One object of the invention is to provide a stand of this character wherein the motor can be supported in upright position, inverted, or at any angle desired by the operator to permit ready access to the various parts of the motor, the bottom portion of the motor, when inverted, being at approximately the same height as the top of the motor when right side up.

Another object is to provide a device of this character which combines means for supporting a rear axle to render the disassembling thereof easy.

A further object is to provide a stand of this character which includes a swinging cradle for the motor, and which cradle is capable of being easily and quickly converted into a work-bench for use in repairing other parts of an automobile.

A still further object is to provide a stand of this character which includes means for driving the crank shaft of the engine, controlling the clutch, and for burning in new bearings for the shaft.

Other objects and advantages will be apparent from the following description when taken in connection with the accompanying drawings.

In the drawings:

Figure 3 is an end view of the stand.

Figure 4 is a top view of the stand showing an axle mounted thereon in position for disassembling.

Figure 5 is an enlarged vertical transverse sectional view through one end of the stand, on the line 5—5 of Figure 2.

Figure 1:
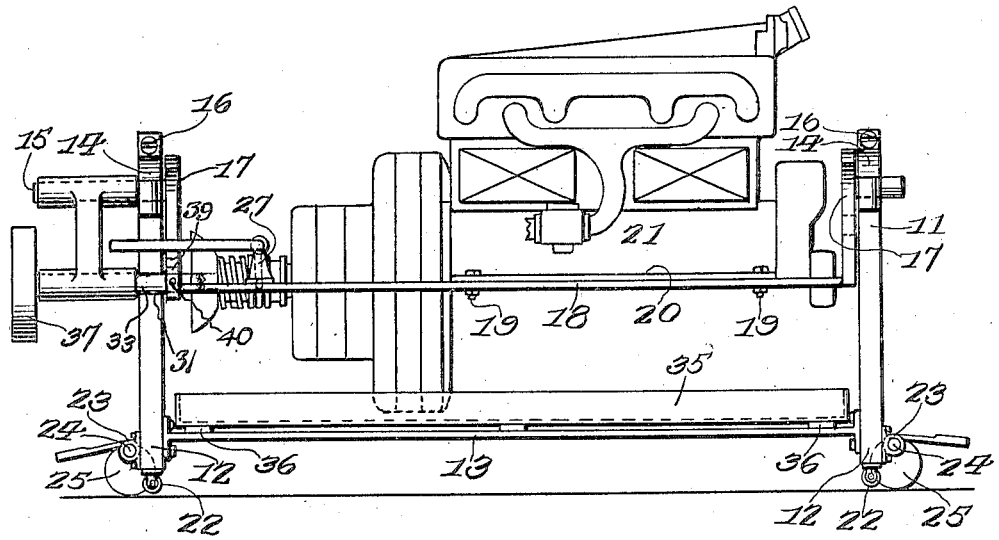
Figure 1 is a side elevation of a stand made in accordance with the invention, the motor being properly held thereon.

Referring particularly to the accompanying drawings, 10 and 11 represent upright end members of the stand which have the floor engaging feet 12, and which feet are connected by the horizontal connecting bars 13. The upper end of each of the uprights is formed with a split shaft bearing 14, adapted to be drawn into firm engagement with the short shafts 15, by the screws 16. Suspended on the shafts 15, for rocking movement, is a cradle which includes the vertical end members 17, which receive the shafts 15, and the longitudinal side bars 18, which extend between the members 17. Each of the side bars 18 is formed with openings for the reception of bolts 19 passed through the suspension brackets 20 of the engine block 21. The feet are provided with the casters 22 to permit the stand being easily moved from place to place. Disposed transversely of each standard or upright 10 and 11, and journaled at its ends in brackets 23, carried by the feet of the uprights, is a rock shaft 24, and formed on the intermediate portion of each shaft is an outwardly extending pedal which, when depressed by the foot of the operator, will rock the shaft and move the arms 25, carried by the shafts, into engagement with the floor to elevate the stand and the casters, to prevent movement of the stand while work is being performed. Hook bolts 26 are engaged through the lower portions of the uprights and also embedded in the cement of the floor of the garage, said bolts being readily removable from the uprights when it is desired to move the stand.

Figure 2:
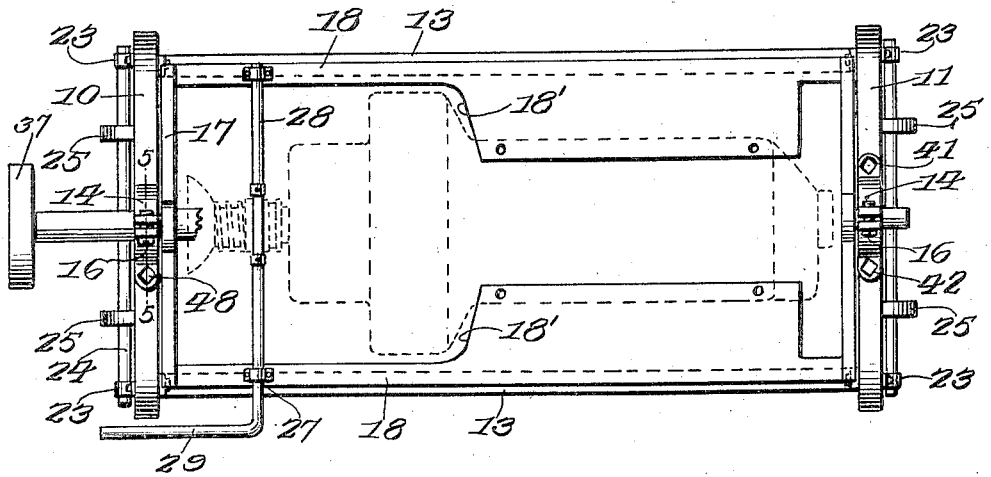
Figure 2 is a top plan view of the same.

The inner faces of the side bars 18 are cut away adjacent one end, as shown at 18' to permit the passage therethrough of the transmission casing of the engine, and extending transversely of the bars 18, and supported in the brackets 27, of the bars 18, is a shaft 28, one end of which is extended angularly to provide a handle lever 29, for rocking the shaft. The intermediate portion of the shaft 28 has a vertically extending yoke 30 which is adapted to engage with the clutch of the engine shaft, when the engine is properly positioned and secured in the cradle. The shaft 28 is mounted adjacent the upright 10, as seen in Figures 1 and 2, of the drawings. In the end members 17, below the openings which receive the shafts 15, there are formed the openings 31 and 32, respectively, the former being adapted to receive a short shaft 33 while the latter is adapted to permit the removal of the cam shaft of the engine, when the cradle and engine are inverted. It will be noted that when the cradle is thus swung upwardly, to place the engine in inverted position, the openings 31 and 32 will be disposed above the upper ends of the uprights.

An oil receiving pan 35 is provided with the cross bars 36 which project beyond the sides of the pan and are arranged to rest on the connecting bars 13, beneath the cradle. On the short shaft 33 there is secured a belt wheel 37 which is adapted to be driven from a line shaft in the garage or repair shop, (not shown), so that the engine shaft can be rotated while the bearings are being burned in. A collar 39, provided with a set screw 40, is carried by the shaft 33 to retain the same in proper position.

In the opposite edge faces, of the upper end of the upright 11, there are formed the pockets 41 and 42, respectively, for the reception of the vertical portions of the angle members 43 and 44 and the stem 49 of the tool cup 50. Each of these members 43 has on its horizontal portion the upwardly extending sectional clamping collar 45 for holding the rear axle casing of the automobile, while the upper end of the vertical portion of each arm has the vertical stub 46, formed on its upper end with a socket member 47, for the reception of a portion of said axle casing. It will be noted that the differential enclosing portion of the axle casing is arranged to rest in the socket 47, while the smaller outer portion of the casing is embraced by the collar 45.

On one side edge of the upper end of the other upright 10 there is formed a similar socket 48 which receives the lower end of the vertical stem 49 of the tool receiving receptacle 50.

When it is desired to tilt the cradle, so that the engine may be placed to permit more ready access to certain parts thereof, the screws 16 are loosened and the cradle swung to the desired position, and the screws again tightened, with the result that the cradle and engine will be held in the desired position. When the bearings are to be operated upon the cradle is swung into inverted position.

When not being used in connection with an engine, the plate 51 is bolted to the cradle, thus converting the device into a work bench.

What is claimed is:

1. A motor repair stand comprising uprights, a rockable cradle mounted on the uprights for supporting an automobile engine and being arranged to be swung into any angle, means on the cradle for controlling the clutch of the engine shaft, and means for driving the engine shaft while the engine is on the cradle.

2. A motor repair stand comprising uprights, a rockable and invertible cradle mounted on the uprights and adapted to support an automobile engine, a swinging bracket removably carried by one of the uprights for supporting the rear axle of an automobile, means on the cradle for rotating the engine shaft to permit repairing the bearings of the shaft, means for operating the clutch of the engine, the cradle having an opening in one end to permit removal of the cam shaft of the engine when the cradle is inverted, and means for converting the cradle into a work bench.

3. A motor repair stand comprising uprights, a cradle mounted on the uprights for supporting an automobile engine and being arranged to be swung into any angle, means on the cradle for controlling the clutch of the engine shaft, and means on one of the uprights for driving the engine shaft while the engine is in the cradle.

4. A motor repair stand comprising supports, a cradle mounted on the supports and adapted to support an automobile engine and to be swung into different angles, a driving means on the support in position to be engaged with the crank shaft of the engine, means on the cradle for operating the clutch of the engine to engage the crank shaft with the said driving means.

In testimony whereof, we affix our signatures, in the presence of two witnesses.

CHARLES W. DICKOVER.
EARL W. HENRY.

Witnesses:
 TIM P. DONOVAN,
 CAROLINE LUDEKING.